(12) United States Patent
Kim

(10) Patent No.: US 7,755,057 B2
(45) Date of Patent: Jul. 13, 2010

(54) CT GANTRY MOUNTED RADIOACTIVE SOURCE LOADER FOR PET CALIBRATION

(75) Inventor: Chang L. Kim, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 401 days.

(21) Appl. No.: 11/682,946

(22) Filed: Mar. 7, 2007

(65) Prior Publication Data
US 2008/0217541 A1 Sep. 11, 2008

(51) Int. Cl.
*H01L 27/146* (2006.01)
*G01T 1/29* (2006.01)
*G01T 1/164* (2006.01)
*G21F 5/02* (2006.01)

(52) U.S. Cl. ............... 250/370.09; 250/363.09; 250/370.1; 250/497.1

(58) Field of Classification Search ............ 250/363.09, 250/497.1, 370.09, 370.1
See application file for complete search history.

(56) References Cited

U.S. PATENT DOCUMENTS

| 5,834,780 | A | 11/1998 | Morgan et al. |
| 6,201,247 | B1 | 3/2001 | Lutheran et al. |
| 6,434,216 | B1 | 8/2002 | Maki et al. |
| 6,631,284 | B2 | 10/2003 | Nutt et al. |
| 7,020,233 | B1 * | 3/2006 | Tybinkowski et al. ......... 378/4 |
| 2004/0031925 | A1 * | 2/2004 | Moyers et al. ......... 250/363.03 |
| 2004/0084638 | A1 * | 5/2004 | Noshi ....................... 250/498.1 |
| 2007/0007455 | A1 * | 1/2007 | Juni ....................... 250/363.04 |
| 2007/0274581 | A1 * | 11/2007 | Wu et al. ..................... 382/131 |

* cited by examiner

*Primary Examiner*—David P Porta
*Assistant Examiner*—Carolyn Igyarto
(74) *Attorney, Agent, or Firm*—Ziolkowski Patent Solutions Group, SC

(57) ABSTRACT

A medical imaging system is provided including a positron emission tomography (PET) imaging apparatus and a computed tomography (CT) imaging apparatus. The CT imaging apparatus includes a rotatable gantry. A radioactive source loader is attached to the rotatable gantry to rotate therewith. The radioactive source loader further includes a radioactive source to calibrate the PET imaging apparatus.

17 Claims, 4 Drawing Sheets

CT GANTRY MOUNTED RADIOACTIVE SOURCE LOADER FOR PET CALIBRATION

BACKGROUND OF THE INVENTION

The present invention relates generally to apparatus used in diagnostic imaging and, more particularly, to a method and apparatus for loading and storing radioactive source pins used in combination PET/CT imaging systems.

The combination PET/CT system has been recognized as an effective medical imaging system that can improve patient diagnosis by producing high quality medical images that not only provide anatomical information and images, but also provides physiological information on the patient.

In the combination PET/CT system, radioactive source pins are used to calibrate the PET detector system and to provide attenuation correction during system use or imaging. Because the pins are radioactive, they are stored in a shielded storage device when not in use. The storage device is structurally secure and shields the environment from radiation exposure from the radioactive source pin. Typically, the storage devices and source pins (i.e., source loaders) are generally stored within the PET system, which adds to the overall space requirements for the PET/CT system. The shielded storage device in existing systems is rather large and takes up a considerable amount of space due in part to the fact that the source pin is a rigid member.

During use, the source pin or pins are withdrawn from storage and placed in a rotatable transmission ring within a bore of the PET detector system. The rotatable transmission ring rotates the radioactive source pin about the PET detector system gantry to calibrate the PET detectors. However, because of the large size of the storage device, it is not possible to mount the source pin directly to the rotatable transmission ring. Thus, the storage device and source pin are mounted to the PET system gantry at a location separate from the rotatable transmission ring. When calibration is desired, the source pin is transported to the rotatable transmission ring. This source pin transport time creates potential non-beneficial radiation exposure that should be minimized.

In addition to unwanted radiation exposure, the transport of the source pin from the storage device to the rotation ring also creates a greater opportunity for mechanical or electrical failure to occur in the system. That is, the transition of the radioactive source pin from the storage shield to its mounting on the rotatable transmission ring involves a number of motion steps in which problems can arise. Because the shielding requirements limit the placement of the storage device, the automatic source pin handling and these motion steps are often complex and unreliable.

Therefore, it would be desirable to design a PET/CT system that includes a compact shielded storage device and radioactive source that minimizes storage space requirements within the system. Furthermore, a PET/CT system design that minimizes the probability of mechanical and electrical failure associated with positioning the radioactive source for PET calibration, by eliminating components and motion steps for positioning the radioactive source, is also desired.

BRIEF DESCRIPTION OF THE INVENTION

The present invention is a directed method and apparatus for loading and storing radioactive source pins used in combination PET/CT imaging systems. A radioactive source loader including a radioactive source therein is attached to a rotatable CT gantry in a combination PET/CT imaging system. The radioactive source loader rotates with the CT gantry to calibrate the PET imaging system.

According to one aspect of the present invention, a medical imaging system includes a positron emission tomography (PET) imaging apparatus and a computed tomography (CT) imaging apparatus having a rotatable gantry. The medical imaging system also includes a radioactive source loader that is attached to the rotatable gantry. The radioactive source loader includes a radioactive source therein to calibrate the PET imaging apparatus.

In accordance with another aspect of the present invention, a combination CT/PET scanning system includes a PET scanner to acquire a PET image of a patient, the PET scanner having a detector array therein. The combination CT/PET scanning system also includes a CT scanner to acquire a CT image of the patient, the CT scanner having a rotatable gantry. A calibration device is also included in the combination CT/PET scanning system and is attached to the CT scanner to rotate with the rotatable gantry and calibrate the detector array in the PET scanner. A radiation shield is positioned about the calibration device to selectively shield radiation produced by the calibration device.

In accordance with yet another aspect of the present invention, a method of constructing a medical imaging device includes the step of positioning a CT image scanner having a rotatable gantry therein in a fixed position relative to a PET image scanner. The method also includes the step of mounting a radioactive source loader on the rotatable gantry of the CT image scanner, wherein the radioactive source loader is configured to calibrate the PET image scanner.

Various other features and advantages of the present invention will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION OF THE PREFERRED EMBODIMENT

Figure 1:
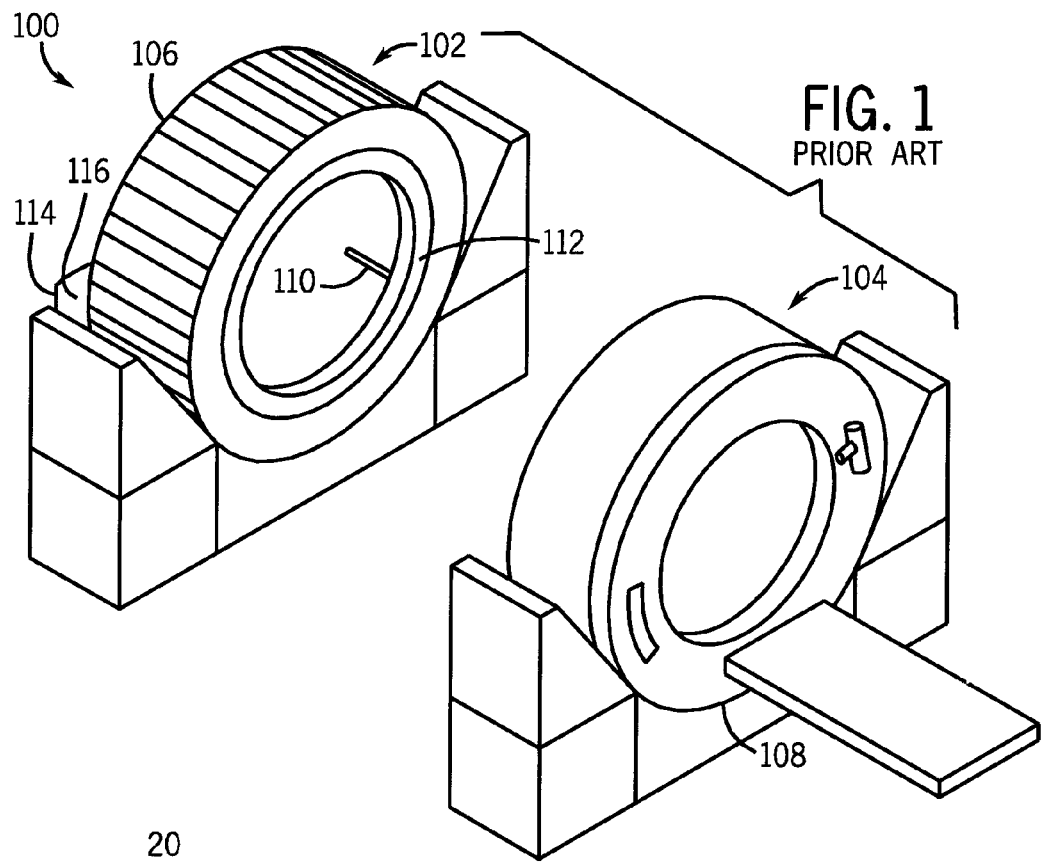
FIG. 1 is an exploded perspective view of a PET/CT imaging system known in the prior art.

Referring to FIG. 1, a combination PET/CT imaging system 100 as known in the prior art is shown. The PET/CT system 100 is constructed to include a PET system 102 and CT system 104 mounted on separate gantries 106, 108. Before scanning of a patient takes place in the system, calibration of the PET system 102 is necessary to ensure accurate readings by the PET detectors therein. In order to calibrate the PET system 102, a radioactive source 110 must be rotated about the PET gantry 106. However, the PET gantry 106 is not capable of rotation, and as such, the rotation of this radiation source 110 in the prior art PET/CT system 100 is achieved by way of a rotation ring 112. During a calibration process the radiation source 110 is placed in the rotation ring 112, which is configured as a separate structure that is mounted to the PET gantry 106 to allow for rotation of the radiation source 110.

Because the radiation emitted by the radiation source 110 is not desirable outside of the calibration process, the radiation source 110 is stored in a source housing 114 when not in use to shield the surrounding environment from radiation exposure. The combination of the radiation source 110 and the source housing 114 is too large to mount to the rotation ring 112 and is therefore positioned adjacent to the rotation ring. When calibration of the PET system 102 is desired, the radiation source 110 is removed from the source housing 114 by a source loader mechanism 116 and placed in the rotation ring 112. The placement of the radiation source 110, source housing 114, and source loading mechanism 116 adjacent to the rotation ring 112 and PET gantry 106 adds to the overall size of the PET/CT system 100 and creates a greater opportunity for mechanical or electrical failure to occur in the system because of the movement associated with the radiation source 110 between the rotation ring 112 and the source housing 114.

Figure 2:
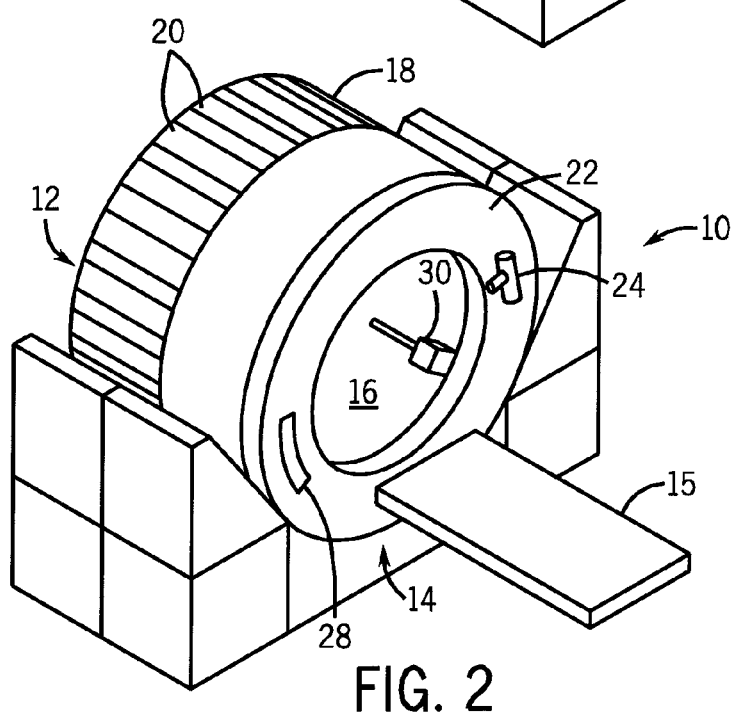
FIG. 2 is a perspective view of a PET/CT imagining system according to one embodiment of the present invention.

Referring now to FIG. 2, one embodiment of a combination PET/CT system 10 according to the present invention is shown. Included in the PET/CT system 10 is a PET system 12 and a CT system 14 positioned in fixed relationship to one another. The PET system 12 and CT system 14 are aligned to allow for translation of a patient (not shown) therethrough. In use, a patient is positioned within a bore 16 of the PET/CT system 10 to image a region of interest of the patient as is known in the art.

The PET system 12 includes a gantry 18 that is configured to support a full ring annular detector array 20 thereon. The detector array 20 is positioned around the central opening/bore 16 and can be controlled to perform detector calibration scans to acquire corrective data and also to perform a normal "emission scan" in which positron annihilation events are counted. To this end, the detectors forming array 20 generally generate intensity output signals corresponding to each annihilation photon.

The CT scanner 14 includes a rotatable gantry 22 having an x-ray source 24 thereon that projects a beam of x-rays 26 toward a detector assembly 28 on the opposite side of the gantry 22. The detector assembly 28 senses the projected x-rays that pass through a patient and measures the intensity of an impinging x-ray beam and hence the attenuated beam as it passes through the patient. During a scan to acquire x-ray projection data, gantry 22 and the components mounted thereon rotate about a center of rotation.

Figure 3A:
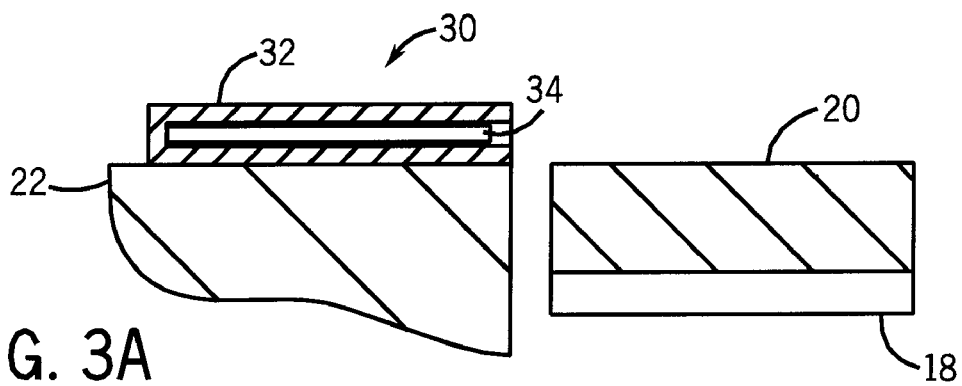
FIGS. 3A-3B are a side elevational view of a radiation source loader according to one embodiment of the present invention.

Also mounted to the rotatable gantry 22 of CT scanner 14 is a radioactive source loader 30 that functions as a calibration device for the detector array 20 of PET scanner 12. As shown in FIG. 3A, one embodiment of radioactive source loader 30 includes a storage shield 32 (i.e., radiation shield) that encloses a radioactive source pin 34. The storage shield 32 surrounds radioactive pin 34 when it is not in use during calibration of the PET detector array 20 and functions to shield the surrounding environment from radiation produced by the pin 34. The storage shield 32 can be circular or rectangular in shape depending on the exact configuration of radioactive pin 34 and is configured to fit about the radioactive pin 34 in a close-fit manner to minimize the overall size of source loader 30, which allows for mounting directly to rotatable gantry 22. As rotatable gantry 22 includes dummy parts (not shown) for weight balance, the mounting of the radioactive source loader 30 thereto will not effect the rotation of the gantry 22 or the performance of the CT system 14.

Figure 3B:
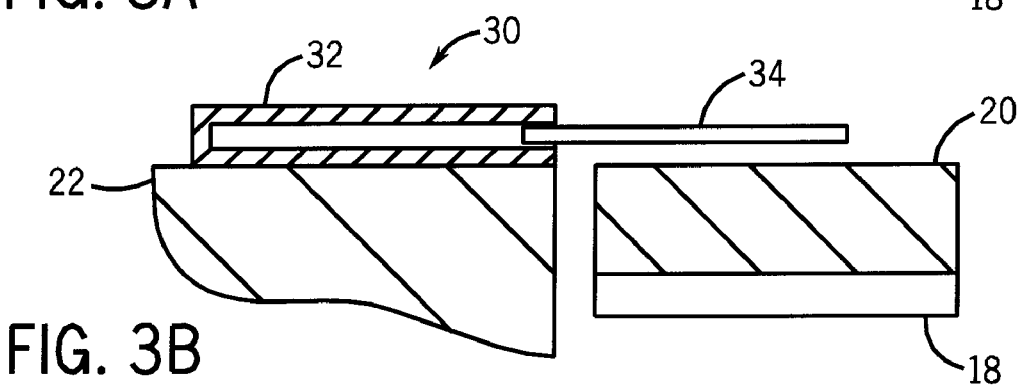
Figure 4A:
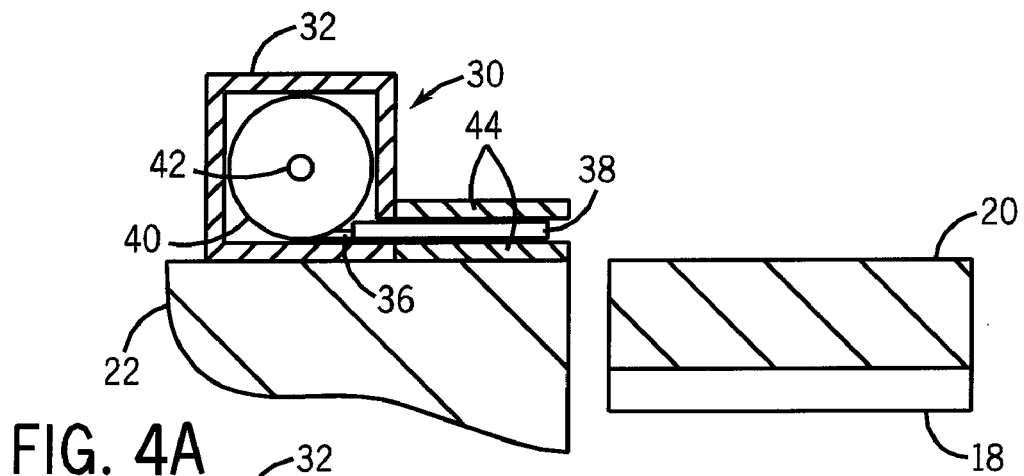
FIGS. 4A-4B are a side elevational view of a radiation source loader according to another embodiment of the present invention.

As shown in FIG. 3B, when calibration of the PET detector array 20 is desired, a majority of radioactive pin 34 is slid out from storage shield 32 to emit radiation as it rotates about the bore 16 on rotatable gantry 22. Radioactive pin 34 travels in a one-dimensional, linear motion relative to the storage shield 32 to extend out therefrom and be exposed to the surrounding environment. After calibration has been completed, radioactive pin 34 is slid back into the storage shield 32 to block radiation. The exact mechanism to move/translate radioactive pin 34 into and out of storage shield 32 can comprise an electric motor (not shown) or another suitable mechanism known in the art As shown in FIG. 4A, in another embodiment of PET/CT system 10 the radioactive source used for calibration is configured to be a flexible member. That is, a radioactive wire, strip, or tubing 36 is positioned within radiation shield 32 and is removable therefrom as desired for calibration of the PET detector array 20. The radioactive wire 36 is composed primarily of wire that is non-radioactive, but is embedded with radioactive segments or inserts 38 in portions thereof. The radioactive wire 36 contained in radiation shield 32 is wound about a roller or spool 40 for storage of the wire 36 when not in use during a calibration process. A means for winding and unwinding the radioactive wire 36 from the spool 40 is included in the radioactive source loader 30. In one embodiment, the means for winding and unwinding the wire is an electric control motor 42 to rotate the spool 40.

Figure 4B:
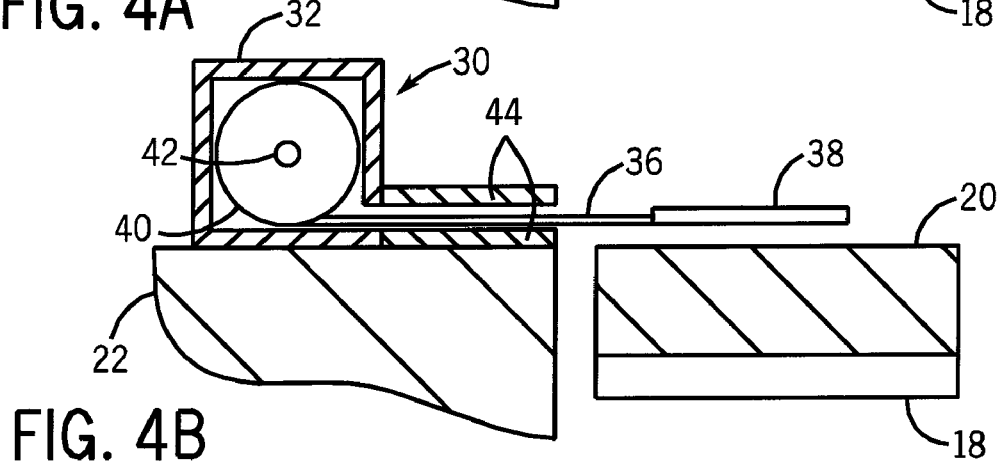

As shown in FIG. 4B, when the radioactive wire 36 is unwound from spool 40, it is guided out from radiation shield 32 by plastic tubing 44. Plastic tubing 44 extends out from radiation shield 32 and is configured to receive the radioactive wire 36 therein. Plastic tubing 44 straightens radioactive wire 36 as it extends into the tubing to form a linearly shaped radioactive source extending out from radiation shield 32. Radiation is emitted from radioactive insert 38 that extends out from plastic tubing 44. It is also envisioned that plastic tubing 44 could extend out further and that radioactive insert would be positioned therein to emit radiation, as the tubing is not configured to provide radiation shielding.

Figure 5A:
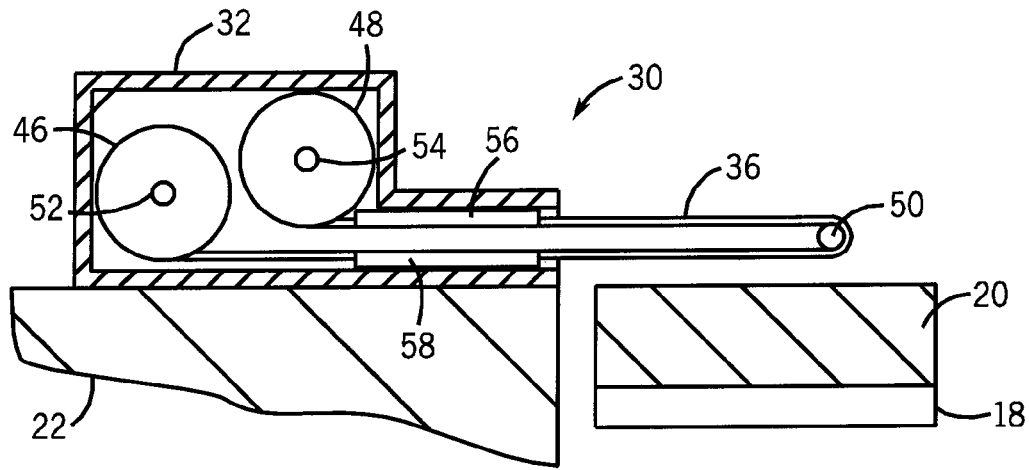
FIGS. 5A-5C are a side elevational view of a radiation source loader according to another embodiment of the present invention.
Figure 5B:
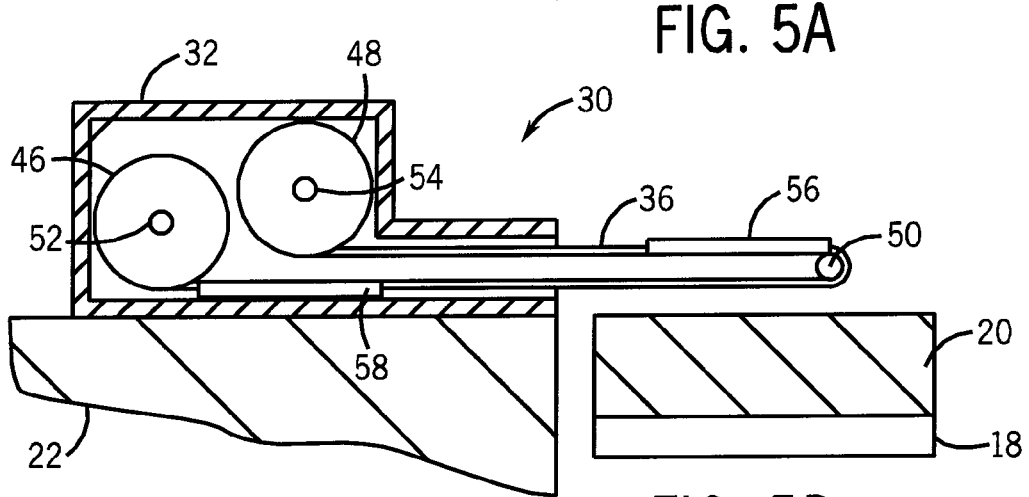
Figure 5C:
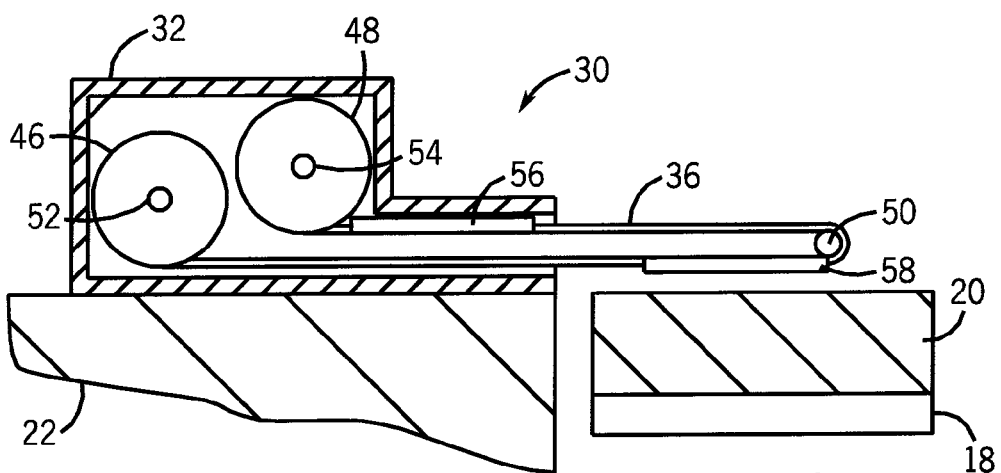

In another embodiment, and as shown in FIG. 5A, radioactive source loader 30 includes a first spool 46 and a second spool 48 positioned within radiation shield 32 that contain a radioactive strip 36 wound thereabout. Radioactive source loader 30 also includes a tensioning member 50 located outside radiation shield 32. Radioactive strip 36 is wound about the first spool 46 and stretched out from radiation shield 32 to wrap around tensioning member 50 and return into the radiation shield to join to second spool 48. An electric motor 52 attached to first roller 46 unwinds radioactive strip 36 therefrom and correspondingly winds the strip 36 onto the second spool 48. A spring-type retractor 54 is included in second spool 48 to unwind radioactive strip 36 therefrom and back onto first spool 46. Radioactive strip 36 includes radioactive inserts 56, 58 thereon that comprise both low radiation inserts 56 and high radiation inserts 58. In one embodiment, low strength germanium-68 is used as the low radiation insert and high strength germanium-68 is used as the high radiation insert. As shown in FIGS. 5B and 5C, an operator can selectively position one of the low and high radiation inserts 56, 58 outside the radiation shield 32 by winding and/or unwinding the radioactive strip 36 a desired amount. The selection of the low or high radiation insert 56, 58 can be performed by an operator based on a desired calibration of the PET detector array 20 shown in FIG. 2.

Figure 6:
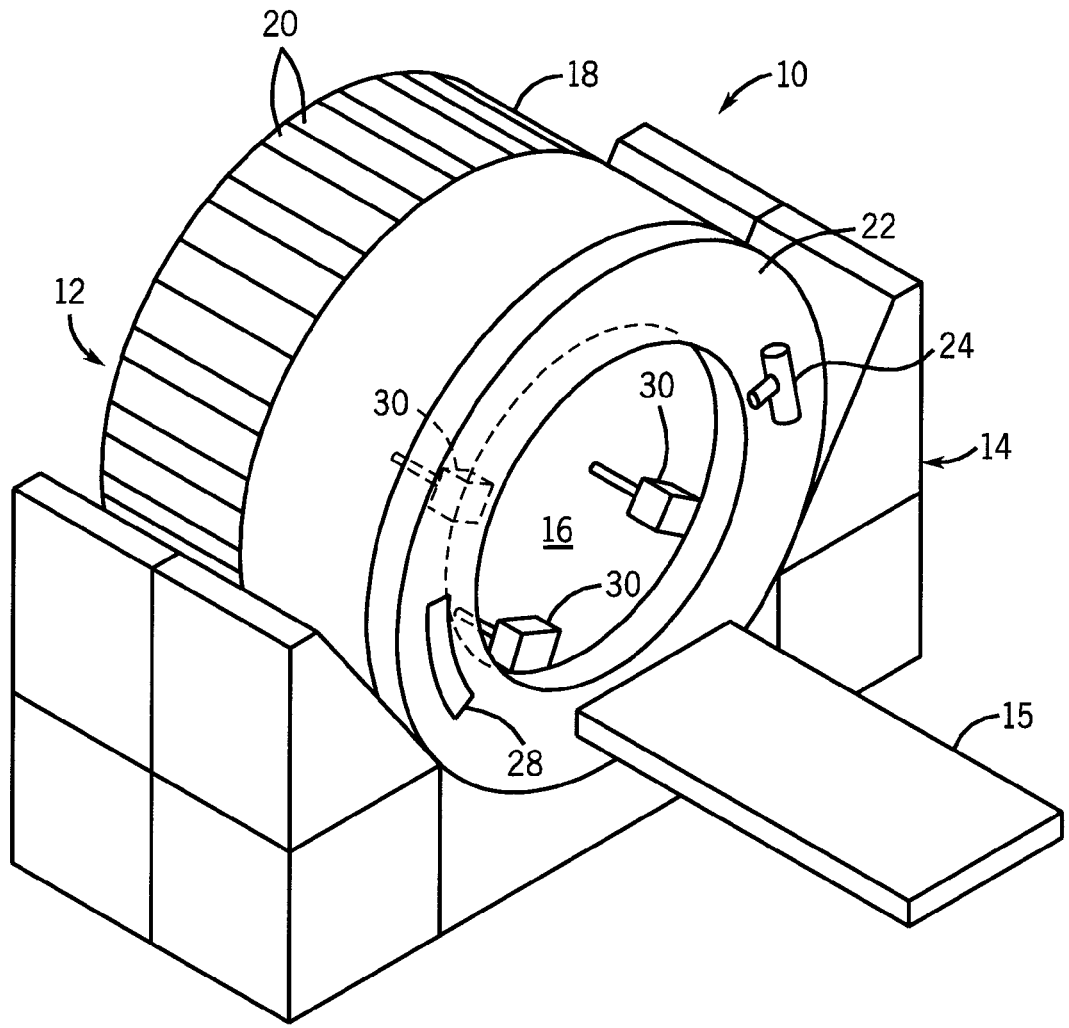
FIG. 6 is a perspective view of a PET/CT imagining system according to one embodiment of the present invention.

In another embodiment, additional radioactive source loaders 30 can be added to the PET/CT system 10. As shown in FIG. 6, three radioactive source loaders 30 are mounted to rotatable gantry 22 of CT scanner 14. The radioactive source of source loaders 30 is shown as a radioactive pin 34, but the radioactive source can also be a radioactive wire, strip, or tubing as set forth in other embodiments of the source loader 30 described in detail above. In one embodiment, radioactive source loaders 30 are positioned equidistant from one another about the rotatable gantry 22, although they can also be spaced in other configurations about the gantry 22. The inclusion of additional radioactive pins 34 about the gantry cuts down on calibration time of the PET system 12 by decreasing the time it takes to rotate the sources about the PET detector array 20. The inclusion of multiple radioactive source loaders 30 also functions to reduce a maximum radiation dose emitted from radioactive pins 34 at any one spot adjacent to the PET detector array 20.

Therefore, according to one embodiment of the present invention, a medical imaging system includes a positron emission tomography (PET) imaging apparatus and a computed tomography (CT) imaging apparatus having a rotatable gantry. The medical imaging system also includes a radioactive source loader that is attached to the rotatable gantry. The radioactive source loader includes a radioactive source therein to calibrate the PET imaging apparatus.

According to another embodiment of the present invention, a combination CT/PET scanning system includes a PET scanner to acquire a PET image of a patient, the PET scanner having a detector array therein. The combination CT/PET scanning system also includes a CT scanner to acquire a CT image of the patient, the CT scanner having a rotatable gantry. A calibration device is also included in the combination CT/PET scanning system and is attached to the CT scanner to rotate with the rotatable gantry and calibrate the detector array in the PET scanner. A radiation shield is positioned about the calibration device to selectively shield radiation produced by the calibration device.

According to yet another embodiment of the present invention, a method of constructing a medical imaging device includes the step of positioning a CT image scanner having a rotatable gantry therein in a fixed position relative to a PET image scanner. The method also includes the step of mounting a radioactive source loader on the rotatable gantry of the CT image scanner, wherein the radioactive source loader is configured to calibrate the PET image scanner.

The present invention has been described in terms of the preferred embodiment, and it is recognized that equivalents, alternatives, and modifications, aside from those expressly stated, are possible and within the scope of the appending claims.

What is claimed is:

1. A medical imaging system comprising:
   a positron emission tomography (PET) imaging apparatus;
   a computed tomography (CT) imaging apparatus including a rotatable gantry; and
   a radioactive source loader attached to the rotatable gantry and being rotatable therewith, the radioactive source loader including:
      a radioactive source configured to calibrate the PET imaging apparatus when in an exposed position; and
      a storage shield to house the radioactive source and shield the ambient environment from radiation produced by the radioactive source when the radioactive source is in a stored position;
   wherein the radioactive source loader is configured to selectively translate the radioactive source between the exposed position and the stored position so as to selectively expose the radioactive source to calibrate the PET imaging system.

2. The medical imaging system of claim 1 wherein the radioactive source comprises a radioactive pin; and
   wherein the radioactive pin is configured to travel in a one-dimensional motion relative to the storage shield so as to be selectively housed therein.

3. The medical imaging system of claim 1 wherein the radioactive source further comprises a radioactive wire having at least one radioactive insert embedded therein.

4. The medical imaging system of claim 3 wherein the radioactive source loader further comprises:
   at least one roller having the radioactive wire wound thereabout; and
   a control motor to turn the at least one roller to wind and unwind the radioactive wire into and out of the storage shield.

5. The medical imaging system of claim 4 wherein the radioactive source loader further comprises a tubular plastic housing attached to the storage shield configured to straighten the radioactive wire when unwound out of the storage shield.

6. The medical imaging system of claim 3 wherein the at least one radioactive insert further comprises at least one of a low radioactivity insert and a high radioactivity insert.

7. The medical imaging system of claim 1 further comprising at least one additional radioactive source loader attached to the rotatable gantry.

8. A combination CT/PET scanning system comprising:
   a PET scanner to acquire a PET image of a patient, the PET scanner having a detector array therein;
   a CT scanner to acquire a CT image of the patient, the CT scanner having a rotatable gantry; and
   a calibration device attached to the CT scanner and that rotates with the rotatable gantry to calibrate the detector array in the PET scanner, the calibration device including:
      a radioactive source;
      a radiation shield positioned about the radioactive source to selectively shield radiation produced by the radioactive source; and
      a means for selectively translating the radioactive source into and out from the radiation shield between a stored position and a calibration position;
   wherein the means for selectively translating the radioactive source translates the radioactive source out from the stored position within the radiation shield to the calibration position when calibration of the detector array is desired.

9. The combination CT/PET scanning system of claim 8 wherein the radioactive source comprises a radioactive source pin, the radioactive source pin being movable along a longitudinal axis of the radiation shield so as to be removable in part therefrom.

10. The combination CT/PET scanning system of claim 8 wherein the calibration device comprises:
   a first spool positioned within the radiation shield;
   a radioactive strip wound about the first spool, the radioactive strip having at least one radiation segment formed therein;
   a means for winding and unwinding the radioactive strip from the first spool; and
   a guide tube extending out from the radiation shield to guide the radioactive strip out from the radiation shield when unwound from the first spool.

11. The combination CT/PET scanning system of claim 10 wherein the calibration device further comprises:

a second spool positioned within the radiation shield and having a portion of the radioactive strip wound thereabout; and a tensioning member positioned outside the radiation shield to tension the radioactive strip between the first and second spools and expose a portion of the radioactive strip outside the radiation shield.

12. The combination CT/PET scanning system of claim 10 wherein the at least one radiation segment further comprises at least one of a high radiation segment and a low radiation segment.

13. The combination CT/PET scanning system of claim 10 wherein the means for winding and unwinding the radioactive strip from the first spool comprises an electric motor.

14. The combination CT/PET scanning system of claim 8 comprising a plurality of calibration devices positioned around the rotatable gantry, wherein the plurality of calibration devices rotate with the rotatable gantry to selectively calibrate the detector array in the PET scanner.

15. A method of constructing a medical imaging device comprising the steps of:

positioning a CT image scanner in a fixed position relative to a PET image scanner, the CT image scanner including a rotatable gantry therein; and mounting a radioactive source loader on the rotatable gantry of the CT image scanner that is configured to calibrate the PET image scanner, wherein mounting the radioactive source loader further comprises:

affixing a radiation shield to the rotatable gantry;

positioning a radiation source within the radiation shield, such that the radiation shield shields the radiation source from an ambient environment when the radiation source is not in use calibrating the PET image scanner; and positioning at least partially within the radiation shield, a means for selectively translating the radiation source into and out from the radiation shield for selective storage of the radiation source and calibration of the PET image scanner.

16. The method of claim 15 wherein positioning the radiation source further comprises positioning a radioactive source pin within the radiation shield, wherein the radioactive source pin is configured to selectively extend out from the radiation shield.

17. The method of claim 15 wherein positioning the radiation source further comprises:

positioning at least one roller within the radiation shield;

winding a radioactive tubing about the at least one roller; and wherein the radioactive tubing is rolled and unrolled from the at least one roller to selectively extend out from the radiation shield.

* * * * *